Patented Feb. 16, 1954

2,669,503

UNITED STATES PATENT OFFICE 2,669,503

METHOD OF RESTORING USED COLOR-REACTANT RECORD MATERIAL FOR REUSE

David W. Steinhardt, Dayton, Ohio, assignor to The National Cash Register Company, Dayton, Ohio, a corporation of Maryland No Drawing. Application June 23, 1951, Serial No. 233,256

9 Claims. (Cl. 8—102)

This invention relates to a method of restoring used color-reactant record material for re-use, and more particularly pertains to record material which is sensitized with an acid-like electron-acceptor adsorbent pigment and discolored by application thereto of a mixture of two kinds of color-reactant substances, a first one of said substances being a double-bond aromatic organic compound which is an electron-donor with respect to the pigment and which on adsorption thereon assumes a more highly polarized conjugated form resulting in an immediate assumption of a distinctive color, and the second substance being an organic compound which slowly oxidizes when in contact with the pigment resulting in a delayed assumption of a distinctive color which is more permanent to the deleterious action of light and air than is the color formed by the first substance. This process will not remove the color of the second substance after it has oxidized.

Hereinafter, the first kind of color-reactant will be identified as an adsorption color-reactant and the second kind of color-reactant will be identified as an oxidation color-reactant.

As examples of the kind of sensitizing material with which the record material is made color-reactant, the following may be mentioned: attapulgite; sodium aluminum silicate zeolite material; sodium aluminum silicate zeolite material in which the base exchange sodium ions have been replaced by any of the following ions: nickel, copper, iron, zinc, mercury, barium, lead, cadmium or potassium; magnesium-trisilicate; pyrophillite; zirconium dioxide; and titanium dioxide. Such materials may be applied to a base web, such as paper, by the use of paper-coating binder material with the ratio of pigment to binder such that a large proportion of the active surface of the pigment is left exposed for contact by the applied color-reactant. Such sensitized record material is disclosed in the United States Letters Patent No. 2,548,364, which was issued on the application of Barrett K. Green and Robert W. Sandberg. As indicated in the patent, material suitable for applying such sensitizing pigment to the paper may be selected from such commonly used binders as paper-coating starch, casein, paper-coating latex made of butadiene-styrene-copolymer material, and the like.

The applied organic adsorbent color-reactant materials useful for application to such sensitized record material, which will turn to a distinctive color when applied thereto, and which may be eradicated by this process, are of the class of organic double-bond aromatic electron-donor compounds, having diphenyl phthalide structures characterized by dialkylamino auxochromic groups, which organic compounds are changed to a more highly polarized conjugated form, giving them a distinctive color, when adsorbed on the sensitized record material. The color reaction is an adsorbent surface chemical reaction.

Following are representative aromatic organic compounds, of the described class, listed with their structures:

(a) 3,3 bis (p-dimethylaminophenyl)-6 dimethylamino phthalide, having the structure

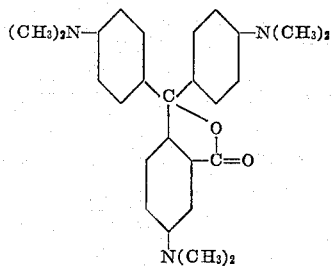

which may be called crystal violet lactone;

(b) 3,3 bis (p-di-n-butylaminophenyl)-6 diethylamino phthalide, having the structure

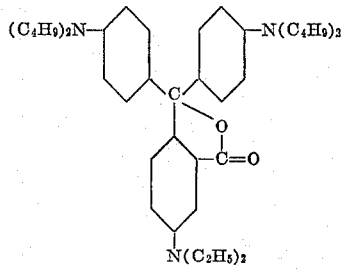

(c) 3,3 bis (p-diethylaminophenyl)-6 diethylamino phthalide, having the structure

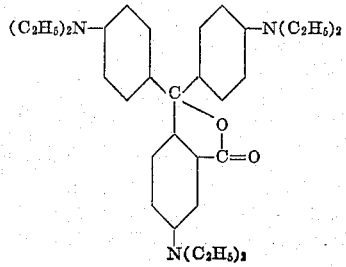

(d) 3,3 bis (p-dimethylaminophenyl) phthalide, having the structure

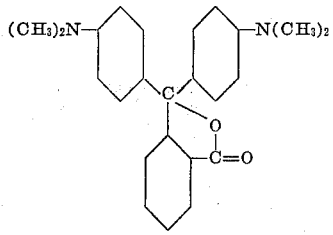

also called malachite green lactone;

(e) 3,3 bis (p - di - n - butylaminophenyl) phthalide, having the structure

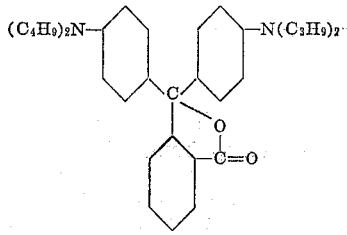

(f) 3,3 bis (p - di - n - propylaminophenyl) phthalide, having the structure

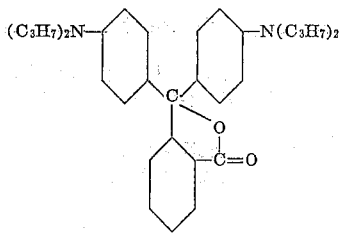

Of the oxidizing type of color-reactants which may be treated by the process may be mentioned.

(a) tetramethyl benzidine, having the structure

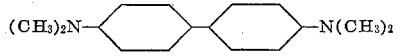

(b) tetraethyl benzidine, having the structure

(c) benzoyl leuco methylene blue, having the structure

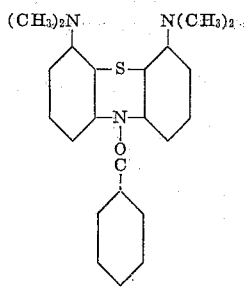

or such in which substitutions have been made in the benzoyl ring to improve the solubility thereof.

The color-reactants of both kinds, in the reacted form, give colors in the blue to blue-green end of the spectrum, whereas they are colorless, or nearly so, in the unreacted state.

The mixture of color reactants is made so that prints made therewith will be immediately apparent and remain so, the adsorbent color-reactant produced color fading slowly, as is customary with such dyestuffs, while the oxidizing color-reactant produced color takes its place.

The two kinds of color reactant may be used in any desired proportions, a one to one ratio having been found desirable. The two kinds of reactants may be dissolved or dispersed in a fluid vehicle for application to the record material. Chlorinated diphenyl with a 48% chlorine content is a suitable solvent vehicle, being practically colorless and non-evaporating.

The novel process includes the application to the mark to be eradicated of a volatile acid to convert the adsorbent color-reactant produced mark to a colorless salt with consequent desorption of the salt from the pigment and the application of a volatile solvent for the unoxidized oxidizable color-reactant to wash it out of the record material, such solvent being used in sufficient quantity to accomplish such washing. It has been found that some solvents also aid in evaporation of the acid and in making the acid more acidic and, thus, such serves a multiple purpose.

The use of the novel eradicating fluid leaves the record material in its original sensitized condition except for the residual salt of the adsorption color reactant, the excess eradicating fluid evaporating.

In some instances the solvent added to the acid may be of two types, one which aids the acid in making it more acidic and the other being a better solvent for the unoxidized oxidizable color reactant.

It is to be understood that marks made and allowed to stand until the oxidizable color-reactant is oxidized cannot be removed by this process insofar as the oxidized color is concerned as the oxidation makes the material insoluble.

Therefore, it is the principal object of the invention to provide a method of eradicating marks from and restoring the sensitivity of record material sensitized with acid-like pigment particles which cause a color to appear in mixtures of certain organic color-reactant adsorbed thereon when transferred thereto by printing or writing operations, and which has been marked by such organic compounds.

A further object of the invention is to provide such a method in which a volatile acid and a solvent are applied to the mark to cause a salt to form in certain of the compounds destroying the color of and causing the desorption of the acid-treated organic color-reactant, and in which the other compounds are washed out by the solvent, accompanied by evaporation of the residual acid.

Another object of the invention is to provide such a process in which the solvent is more volatile than the acid and aids in making the acid more effective and aids in the evaporation of it.

In a preferred embodiment of the invention two parts of glacial acetic acid is dissolved in 98 parts of acetone, by volume, such solution instantaneously decoloring the adsorption color-reactant on the areas of the record material to which it is applied, washing out the oxidizing reactant, and evaporating rapidly. The preferred solution is chosen because it has not an unpleasing odor, and is relatively inert toward paper, which latter is the most commonly used substance for forming the base record material. In the solution of glacial acetic acid and acetone, the glacial acetic acid may be used in as low a concentration as ¾ of one part to 99¼ parts of acetone, or as high as 50 parts of glacial acetic acid to 50 parts of acetone. The following may be substituted for acetic acid in the above formulation in equivalent concentration:

Propionic acid, butyric acid, ethylhexoic acid. Concentrated hydrochloric acid, of 35% HCl, may be used with acetone up to about five parts of the hydrochloric acid to 95 parts acetone, by volume.

As substitutes for acetone solvent may be mentioned methyl-ethyl-ketone and ethyl acetate.

The named solvents may be replaced to the extent of 50 per cent, or more, by substitute solvents such as benzene or toluene.

It will be observed that all of the named organic color-reactant compounds have the common formula 3,3 bis (p-dialkylaminophenyl) phthalide or 3,3 bis (p-dialkylaminophenyl)-6 dialkylamino phthalide. The general structural formula for such compounds is as follows:

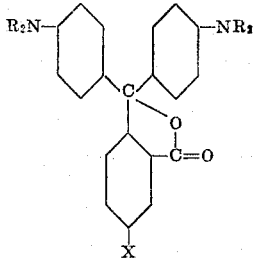

where R is a saturated alkyl group containing not more than four carbon atoms and where X, if present, may be a dialkylamino group, containing not more than 4 carbon atoms in an alkyl group.

In use, the solution may be applied to the marks, words, letters or characters it is desired to eradicate, by flooding them with a swab or dropper, it being desirable to put a blotter beneath the material to soak up the fluid which carries with it the oxidizable reactant. It has been found that marking fluid "pencils," which have a barrel in the cavity of which the fluid is contained and which feeds such fluid to a felt stylus, are admirably adapted for the application of the novel fluid to paper, as in typewriting where the paper remains rolled around the supporting platen.

The invention is not to be deemed limited to the use of the named compounds where equivalents are operative. Any mixtures of the named color-reactants may be used.

Reference is made to application Serial No. 233,255, filed by applicant on the same day with this application, for a process used to restore the sensitivity of used sensitized record material of the class described where the colored marks have been made by adsorption color-reactants alone.

What is claimed is:

1. In the method of eradicating colored marks from used record material sensitized with particles of an acid-like electron acceptor adsorbent pigment and upon which the colored marks were made by having applied thereto a marking material including an organic double-bond aromatic electron donor compound having a diphenyl phthalide structure characterized by having saturated dialkylamino auxochromic groups on the phenyl nuclei, which marking material by chemical adsorption on the pigment immediately had been changed to a more highly polarized conjugated form accompanied by a change in color, and upon which record material there is further present in yet unoxidized form a colorless compound from the group consisting of tetramethyl benzidine, tetraethyl benzidine, benzoyl leuco methylene blue, and mixtures thereof, which are oxidizable upon long contact with the aforesaid adsorbent pigment to a colored form, and as an incident to said eradication, restoring the sensitivity of said record material at said points where discolored, the step of flooding the record material at the marked area with a volatile fluid, said fluid containing a volatile acid and a volatile organic solvent, said acid being strong enough as an electron acceptor to react with the phthalide compound to form a salt with the auxochromic groups thereof, destroying its color, whereby because of said salt formation the phthalide compound adsorbed chemically on the pigment desorbs therefrom, the aforesaid solvent acts to wash away the oxidizable compound, and the excess fluid acid volatilizes, thus leaving the record material dry and the treated adsorbent surfaces of the pigment chemically active.

2. The method of claim 1, in which the volatile solvent is chosen so as to increase the acidity of the acid.

3. The method of claim 1, in which the acid is a volatile fluid aliphatic acid.

4. The method of claim 1, in which the volatile solvent is acetone.

5. The method of claim 1 in which the volatile solvent is methyl-ethyl-ketone.

6. The method of claim 1, in which the volatile solvent is ethyl acetate.

7. The method of claim 1, in which the record material has been discolored with adsorbent compounds selected from the group represented by the following structure

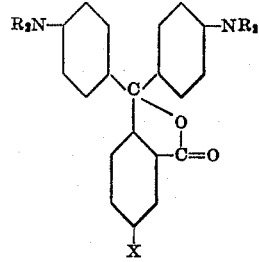

where R is a saturated alkyl group containing not more than four carbon atoms, and where X is taken from the groups consisting of a hydrogen atom and a dialkylamino group of not more than eight carbon atoms.

8. The method of claim 1, in which the acid is selected from the group consisting of acetic, propionic, butyric, ethylhexoic and hydrochloric acids.

9. The method of claim 8, in which the acid is dissolved in the solvent in amounts ranging from ¾ to 50 parts per hundred of solvent, by volume, the hydrochloric acid being used in not more than 5 parts per hundred of solvent, by volume.

DAVID W. STEINHARDT.

References Cited in the file of this patent

UNITED STATES PATENTS

| Number | Name | Date |
|---|---|---|
| 1,497,138 | Farrow | June 10, 1924 |
| 1,525,750 | Kocher | Feb. 10, 1925 |
| 2,524,811 | Koberlein | Oct. 10, 1950 |
| 2,548,364 | Green et al. | Apr. 10, 1951 |
| 2,548,366 | Green et al. | Apr. 10, 1951 |
| 2,550,467 | Green et al. | Apr. 24, 1951 |

FOREIGN PATENTS

| Number | Country | Date |
|---|---|---|
| 591,122 | Great Britain | Aug. 7, 1947 |

OTHER REFERENCES

Hauser et al., "Color Reactions Between Clays and Amines," Journal American Chem. Society, volume 62, July 1940, pages 1811 to 1814.